(12) United States Patent
Henson et al.

(10) Patent No.: US 12,251,885 B2
(45) Date of Patent: Mar. 18, 2025

(54) U-SHAPED INDUCTION WELDING COIL AND METHOD OF USE THEREOF

(71) Applicant: The Boeing Company, Chicago, IL (US)

(72) Inventors: Landon Keith Henson, Snoqualmie, WA (US); John R. Hull, Sammamish, WA (US)

(73) Assignee: The Boeing Company, Chicago, IL (US)

( * ) Notice: Subject to any disclaimer, the term of this patent is extended or adjusted under 35 U.S.C. 154(b) by 769 days.

(21) Appl. No.: 17/515,383

(22) Filed: Oct. 29, 2021

(65) Prior Publication Data

US 2022/0194017 A1 Jun. 23, 2022

Related U.S. Application Data

(60) Provisional application No. 63/127,113, filed on Dec. 17, 2020.

(51) Int. Cl.
| | |
|---|---|
| *B29C 65/32* | (2006.01) |
| *B29C 65/22* | (2006.01) |
| *B29L 31/30* | (2006.01) |

(52) U.S. Cl.
CPC ............ *B29C 65/32* (2013.01); *B29C 65/222* (2013.01); *B29L 2031/3076* (2013.01)

(58) Field of Classification Search
CPC ... B29C 65/32; B29C 65/222; B29C 65/3632; B29C 65/3668; B29C 65/3684; B29C 66/3494; B29C 66/43; B29C 66/45; B29C 66/71; B29C 66/721; B29C 66/73921; B29C 66/8322; B29C 66/863; B29C 66/91216; B29C 66/91231; B29C 66/1122; B29L 2031/3076; B29K 2071/00
See application file for complete search history.

(56) References Cited

U.S. PATENT DOCUMENTS

| | | | | |
|---|---|---|---|---|
| 5,444,220 A | * | 8/1995 | Hansen | B29C 66/1122 219/676 |
| 5,500,511 A | * | 3/1996 | Hansen | B29C 66/3472 156/272.4 |
| 2021/0039329 A1 | * | 2/2021 | DiChiara | B29C 66/1122 |

FOREIGN PATENT DOCUMENTS

| | | | | |
|---|---|---|---|---|
| WO | WO-2009063515 A1 | * | 5/2009 | B23K 35/02 |
| WO | WO-2014199251 A1 | * | 12/2014 | H05B 6/02 |

* cited by examiner

*Primary Examiner* — John P. Dulka
(74) *Attorney, Agent, or Firm* — Yee & Associates, P.C.

(57) ABSTRACT

An induction welding coil includes a spine having a planar body with opposing ends, and a pair of prongs extending perpendicularly from the opposing ends of the spine. Each of the prongs has a planar body, wherein the spine and the pair of prongs are formed from a ferrite material to define a ferrite core. The induction welding coil further includes a coil wire having a plurality of winding that surround the planar body of the spine.

20 Claims, 9 Drawing Sheets

U-SHAPED INDUCTION WELDING COIL AND METHOD OF USE THEREOF

CROSS-REFERENCE TO RELATED APPLICATION

This application claims the benefit of and priority to U.S. Provisional Application No. 63/127,113, entitled "METHODS AND APPARATUS FOR INDUCTION WELDING", filed Dec. 17, 2020, which is incorporated by reference herein in its entirety.

BACKGROUND

Different techniques can be used to form plastic products, such as fabricating thermoplastic panels for aircraft. For example, aircraft are being designed and manufactured with greater percentages of composite materials. Composite materials are used in aircraft to decrease the weight of the aircraft. This decreased weight improves performance features such as payload capacity and fuel efficiency. Further, composite materials provide longer service life for various components in an aircraft.

In manufacturing composite structures, different joining technologies are used, including mechanical fastening, adhesive bonding, and welding. With respect to welding, a thermoplastic weld is created when the thermoplastic material on the surface of two composite components is heated to the melting or softening point and the two surfaces are brought into contact so that the molten thermoplastic mixes. Then, the surfaces are held in contact while the thermoplastic cools below the softening temperature to fuse the thermoplastic into the thermoplastic weld.

In composite welding, induction welding processes are often used. In these processes, the composite components are placed substantially parallel to the magnetic flux during induction welding processes. Certain geometries/arrangements of composite components to be induction welded may not be capable of having induction welding coils placed on both sides of the components to be induction welded. As a result, coils are placed on one side of the components, but this results in uneven heating when a conventional induction welding coil is used to produce an induction weld. Further, due to the uneven heating, the welding may require longer than desired induction welding times as a result of having to use lower power settings to the induction welding coil. By using lower power settings, the risk of overheating in areas that preferentially heat first are reduced, but the time needed to generate a sufficient induction weld is increases.

Thus, while composite materials, such as thermoplastics, can provide improved operating features, the fabrication of these components, such as in areas with limited space, and has been problematic with no robust process to produce the components. A need exists for a welding process that allows for efficient welding of joints using induction welding coils from one side to form the composite components.

SUMMARY

With those needs in mind, certain examples of the present disclosure provide a composite sandwich panel that includes a first composite part and a second composite part.

In at least one example, an induction welding coil comprises a spine having a planar body with opposing ends, and a pair of prongs extending perpendicularly from the opposing ends of the spine. Each of the prongs has a planar body, wherein the spine and the pair of prongs are formed from a ferrite material to define a ferrite core. The induction welding coil further comprises a coil wire having a plurality of winding that surround the planar body of the spine.

Certain examples of the present disclosure provide a method for induction welding or an induction welding system that uses the induction welding coil.

BRIEF DESCRIPTION OF THE DRAWINGS

These and other features, aspects, and advantages of the present disclosure will become better understood when the following detailed description is read with reference to the accompanying drawings in which like numerals represent like parts throughout the drawings, wherein.

DETAILED DESCRIPTION

Figure 1:
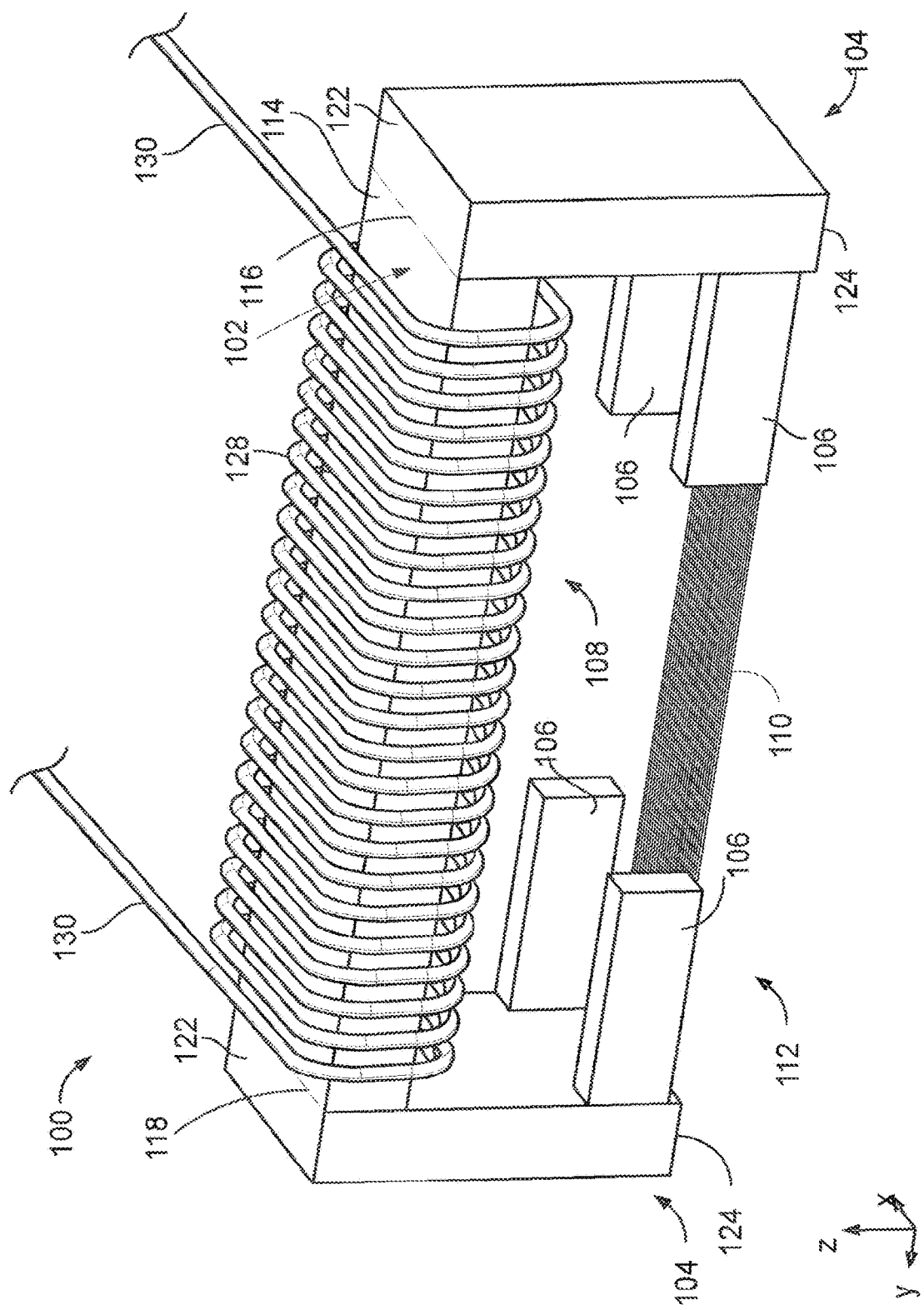
FIG. 1 is an illustration of an induction welding coil according to an implementation of the present disclosure.

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property can include additional elements not having that property.

While various spatial and directional terms, such as "top," "bottom," "upper," "lower," "vertical," and the like are used to describe embodiments of the present disclosure, it is understood that such terms are merely used with respect to the orientations shown in the drawings. The orientations can be inverted, rotated, or otherwise changed, such that a top side becomes a bottom side if the structure is flipped 180 degrees, becomes a left side or a right side if the structure is pivoted 90 degrees, and the like.

Certain embodiments of the present disclosure include apparatus and methods for fabrication of plastic parts, such as thermoplastic sandwich panels. In some examples, the induction welding is performed using a customizable induction welding coil with ferrite cores, which can also include the varied placement of smart susceptor wires. As a result, rapid uniform heating is performed such that, for example, susceptor wires located in joints are rapidly heated to melt the thermoplastic material in joint areas to produce a welded thermoplastic composite component. That is, the magnetic flux generated by the induction welding coil can be optimized for a given geometric orientation of composite parts to allow the parts to be induction welded using an induction welding coil on only one side of the composite parts. Further, the placement of smart susceptor wires further allows magnetic flux to be focused to generate even heating and thus more rapid induction welding times.

Figure 2:
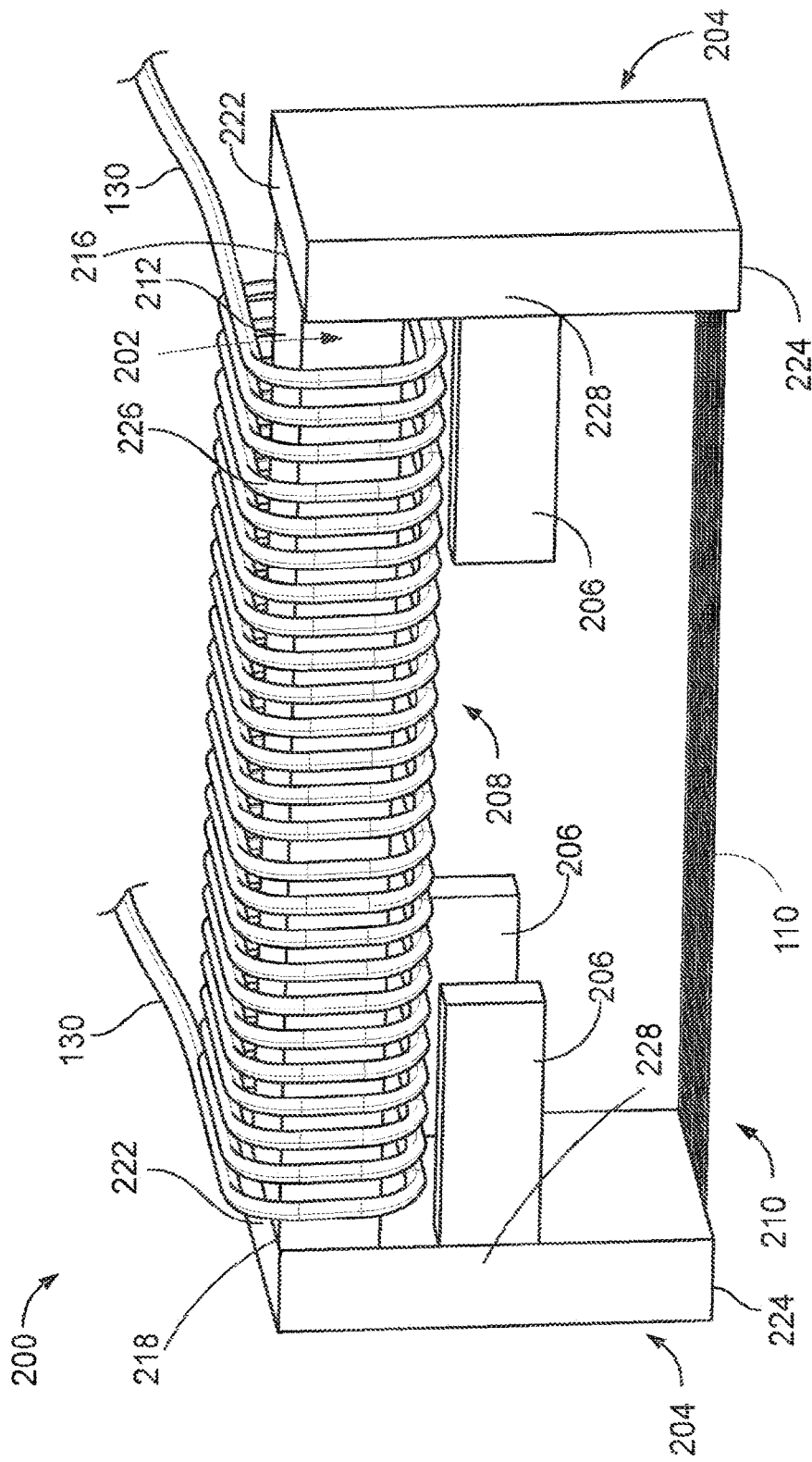
FIG. 2 is an illustration of an induction welding coil according to another implementation of the present disclosure.
Figure 3:
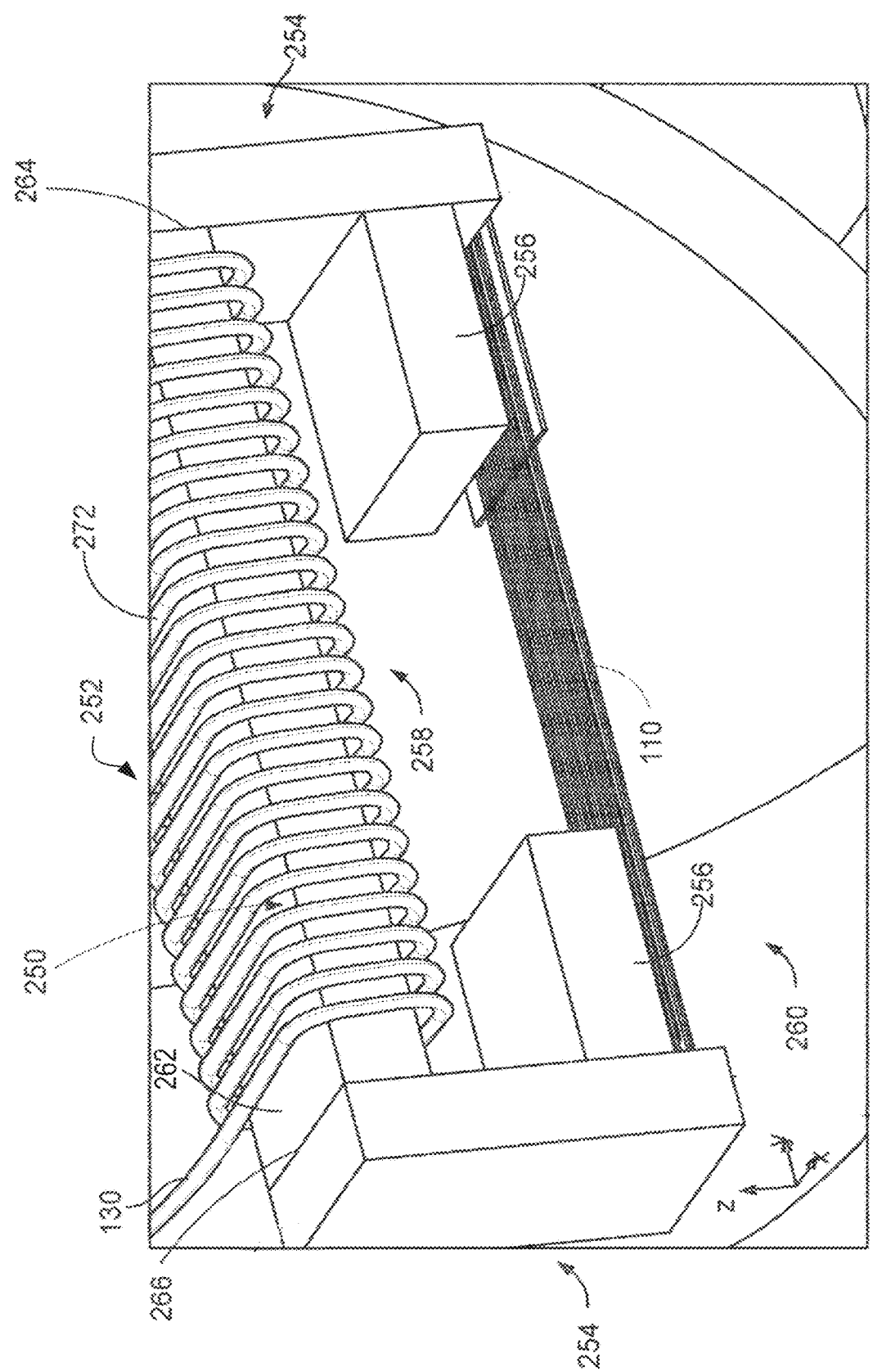
FIG. 3 is an illustration of an induction welding coil according to another implementation of the present disclosure.

As illustrated in FIGS. 1-3, shaped ferrite cores 112, 210 and 260 are positioned within the induction welding coil in order to guide the magnetic flux produced by the coil in an optimized manner. Additionally, or optionally, varied placement of smart susceptor wires (e.g., a varied density of the wires) within a resin further controls and obtains uniform heating at the weld interface. With the present disclosure, the composite components do not have to be completely encapsulated inside the induction welding coil itself. Also, the coil does not have to be in constant motion relative to the composite components being welded. Thus, various examples disclosed herein remove or eliminate restrictions and/or limitations with conventional coil arrangements for induction welding. For example, various configurations provide a welding tool (e.g., "wand" shaped tool) for welding of composite parts (e.g., thermoplastic parts), such as in an inaccessible aircraft environment, that provides uniform and rapid heating of the welding interface between the composite parts from one side of the composite parts.

More particularly, one or more induction welding coils 100, 200, and 250 are configured to operate in an induction welding system (e.g., an induction welding system 600 shown in FIG. 7) to create an induction weld between two parts with improved heating, namely, more rapid and uniform heating from only one side of the two parts. That is, the induction welding coils 100, 200, and 250 include shaped ferrite cores positioned within the induction welding coil, and in some examples, placed relative to susceptor wires, to result in more uniform weld temperature and heat times. The ferrite core sizing and positions are configurable to maintain an intensity of flux, and ideal current and voltage parameters. It should be noted that in various examples, susceptor wires or susceptor wire patches are shown, and do not form part of the induction welding coils 100, 200, 250.

With particular reference to FIG. 1, the induction welding coil 100 includes a ferrite core formed from a spine 102 (e.g., a ferrite slab having a planar body 114) and a pair of prongs 104 extending therefrom. Additionally, or optionally, auxiliary pieces 106 extend or protrude from each of the prongs 104. In the illustrated example, the prongs 104 extend from ends 116, 118 of the spine 102 in a direction perpendicular to the spine 102. That is, the spine 102 and a pair of prongs 104 form a generally "U-shaped" core as viewed in FIG. 1. It should be noted that while the prongs 104 are illustrated as abutting ends 116, 118 of the planar body 114 of the spine 102, to thereby extend from sides of the planar body 114, in some examples, the prongs 104 extend from a top surface or a bottom surface of the planar body 114.

The auxiliary pieces 106 extend perpendicular to the prongs 104 and parallel to the spine 102. In the illustrated example, the spine 102 and auxiliary pieces 106 are generally rectangular ferrite pieces or slabs, wherein the auxiliary pieces 106 are rotated generally ninety degrees relative to the spine 102. That is, the orientation of the spine 102 and the auxiliary pieces 106 is different relative to the prongs 104. It should be appreciated that different orientations, as well as sizes and shapes of the spine 102, the prongs 104, and the auxiliary pieces 106 are contemplated by the present disclosure. The configuration of the spine 102, the prongs 104, and the auxiliary pieces 106 are shown for illustration only. For example, a different configuration is shown in FIG. 2 that illustrates the induction welding coil 200. In various examples, the size (including thickness), shape, orientation, etc. of the spine 102, the prongs 104, and auxiliary pieces 106 can be varied to control or "shape" the magnetic flux generated by the induction welding coil 100. In some examples, one surface of the auxiliary pieces 106 are in a same plane as susceptor wires 110 that are described in more detail below.

In some examples, the auxiliary pieces 106 are positioned outside of a welding patch (e.g., outside a patch of susceptor wires 110), such as when auxiliary pieces 106 and patch occupy the same plane. In other examples, the auxiliary pieces 106 are not parallel to the spine 102, but tilting toward or away from the patch as the auxiliary pieces 106 extend from prongs 104 toward the center of the induction welding coil 100. The auxiliary pieces 106 can be cut in some examples so that only one surface of each of auxiliary pieces 106 touches prongs 104 or not cut so that a triangular prism gap forms between the auxiliary piece 106 and prongs 104.

In this example, each prong 102 of the pair of prongs 104 has opposing ends 122, 124, wherein a first end 122 of the opposing ends 122, 124 of each prong 102 abuts a corresponding opposing end 116, 118 of the planar body 114 of the spine 102. The auxiliary pieces 106 extend perpendicularly from the second end 124 of the opposing ends 122, 124 of each prong 104.

The induction welding coil 100 further includes coil 108 of wire 130 extending around the spine 102. That is, a plurality of windings 128 of coil 108 of wire 130 extend around and surround the spine 102 along a longitudinal axis thereof. The size and placement of the windings 128 can be varied and configured according to coil wire placement techniques for induction welding coils. For example, the configuration of coil 108 of wire 130 can be provided based on the requirements for the induction welding, the type of induction welding system to be used, etc. It should be noted that in some examples, lead wires to the coil wire 108 are connected to a power supply (not shown) that provides voltage at a specified frequency, such as between 10 kHz and 1 MHz. However, other frequencies can be used.

In the illustrated examples, the susceptor wires 110, configured as "smart" susceptor wires, are placed along a weld joint, such as a weld joint of two composite parts to be induction welded. For example, embedded susceptor wires 110 are positioned between composite parts in some examples, such that a magnetic flux generated by the induction welding coil 100 penetrates the susceptor wires 110. The penetrating flux induces eddy currents and magnetic hysteresis heating in the susceptor wires 110, which results in rapid heating. It should be noted that the susceptor wires 110 stop heating at a Curie temperature thereof.

With the present disclosure, the magnetic density lines generated by the induction welding coil 100 are focused and produce more uniform and effective heating of the joint line or welding interface. That is, the configuration of the induction welding coil 100, including the customizable configuration of the spine 102, the prongs 104, and auxiliary pieces 106, facilitates "guiding" the magnetic flux produced by coil 108 of wire 130. As such, by configuring the various components, including the spine 102, the prongs 104, and auxiliary pieces 106, the magnetic flux is "shaped" in a desired manner while the magnetic flux is applied on only one side of the components to be welded. So, for example, the susceptor wires 110, when present, are more evenly heated, resulting in more efficient melting along the joint line (also referred to as a weld line or weld join line).

In one example, a rectangular bobbin configuration is provided having eleven turns of coil 108 of wire 130 (e.g., eleven turns of 14-16 AWG wire composed of Litz wire with a filament diameter small enough to ensure nearly uniform current density in the cross-section of each filament for the applied frequency used). In this example, coil 108 of wire 130 is wound on an additively manufactured acrylonitrile butadiene styrene (ABS) plastic bobbin that has a cavity into which the spine 102 (e.g., ferrite spine) is inserted and a cut out on each end for the prongs 104 to be inserted. It should be appreciated that different sizes and spacings of the windings 128 are contemplated. In one example, the windings 128 of coil 108 of wire 130 are arranged to extend across an area adjacent to the susceptor wires 110.

With particular reference to FIG. 2, the induction welding coil 200 includes a ferrite core formed from a spine 202 (e.g., a ferrite slab having a planar body 212) and a pair of prongs 204 extending therefrom. Additionally, or optionally, auxiliary pieces 206 protrude from each of the prongs 204. In the illustrated example, the prongs 204 extend from ends 216, 218 of the spine 202 in a direction perpendicular to the spine 202. That is, the spine 202 and a pair of prongs 204 form a generally "U-shaped" core as viewed in FIG. 2. It should be noted that while the prongs 204 are illustrated as abutting ends 216, 218 of the planar body 212 of the spine 202, to thereby extend from sides of the planar body 212, in some examples, the prongs 204 extend from a top surface or a bottom surface of the planar body 212.

The auxiliary pieces 206 extend perpendicular to the prongs 204 and parallel to the spine 202. In the illustrated example, the spine 202 and auxiliary pieces 206 are generally rectangular ferrite pieces or slabs, wherein the auxiliary pieces 206 are rotated generally ninety degrees relative to the spine 202. That is, the orientation of the spine 202 and auxiliary pieces 206 is different relative to the prongs 204. It should be appreciated that different orientations, as well as sizes and shapes of the spine 202, the prongs 204, and auxiliary pieces 206 are contemplated by the present disclosure. The configuration of the spine 202, the prongs 204, and auxiliary pieces 206 are shown for illustration only. For example, a different configuration of the spine 202, the prongs 204, and auxiliary pieces 206 is shown in FIG. 1 that illustrates the induction welding coil 100 as already described. That is, the size (including thickness), shape, orientation, etc. of the spine 202, the prongs 204, and auxiliary pieces 206 can be varied to control or "shape" the magnetic flux generated by the induction welding coil 200. In some examples, one surface of the auxiliary pieces 206 are in a same plane as the susceptor wires 110.

In some examples, the auxiliary pieces 206 are positioned outside of a welding patch (e.g., outside a patch of susceptor wires 110), such as when the auxiliary pieces 206 and patch occupy the same plane. In other examples, the auxiliary pieces 206 are not parallel to the spine 202, but tilting toward or away from the patch as the auxiliary pieces 206 extend from the prong 204 toward the center of the induction welding coil 200. The auxiliary pieces 206 can be cut in some examples so that one surface touches the prong 204 or not cut so that a triangular prism gap forms between the auxiliary piece 206 and the prong 204.

In this example, each prong 204 of the pair of prongs 204 has opposing ends 222, 224, wherein a first end 222 of the opposing ends 222, 224 of each prong 204 abuts a corresponding opposing end 216,218 of the planar body 212 of the spine 202. The auxiliary pieces 206 extend perpendicularly from the second end 224 of the opposing ends 222, 224 of each prong 204.

The induction welding coil 200 further includes coil 208 of wire 130 extending around and surrounding the spine 202. That is, a plurality of windings 226 of coil 208 of wire 130 extend around the spine 202 along a longitudinal axis thereof. The size and placement of the windings 226 can be varied and configured according to coil wire placement techniques for induction welding coils. For example, the configuration of coil 208 of wire 130 can be provided based on the requirements for the induction welding, the type of induction welding system to be used, etc. It should be noted that in some examples, lead wires to coil 208 of wire 130 are connected to a power supply (not shown) that provides voltage at a specified frequency, such as between 10 kHz and 1 MHz. However, other frequencies can be used.

With the present disclosure, the magnetic density lines generated by the induction welding coil 200 are focused and produce more uniform and effective heating of the joint line. That is, the configuration of the induction welding coil 100, including the customizable configuration of the spine 202, the prongs 204, and auxiliary pieces 206, facilitates "guiding" the magnetic flux produced by coil 208 of wire 130. As such, by configuring the various components, including the spine 202, the prongs 204, and auxiliary pieces 206, the magnetic flux is "shaped" in a desired manner. So, for example, the susceptor wires 110, when present, are more evenly heated, resulting in more efficient melting along the joint line.

In one example, a rectangular bobbin configuration is provided having eleven turns of coil 208 of wire 130 (e.g., eleven turns of 14-16 A WG wire composed of Litz wire with a filament diameter small enough to ensure nearly uniform current density in the cross-section of each filament for the applied frequency used). In this example, the coil 208 of wire 130 is wound on an additively manufactured ABS plastic bobbin that has a cavity into which the spine 202 (e.g., ferrite spine) is inserted and a cut out on each end for the prongs 204 to be inserted. It should be appreciated that different sizes and spacings of the windings are contemplated. In one example, the windings 226 of t coil 208 of wire 130 are arranged to extend across an area adjacent to the susceptor wires 110.

As can be seen, the spine 202, the prongs 204, and auxiliary pieces 206 of the induction welding coil 200 are sized and shaped generally the same as the spine 102, the prongs 104, and auxiliary pieces 106 of the induction welding coil 100. However, in the induction welding coil 200, the auxiliary pieces 206 are positioned about halfway along (i.e., in the middle lengthwise of) the prongs 204. That is, the auxiliary pieces 206 extend or protrude from a middle portion 228 of each of the prongs 204. In the induction welding coil 100, the auxiliary pieces 106 extend or protrude from an end portion of each of the prongs 104. That is, one of the opposing ends 222 of each prong 204 abuts a corresponding opposing end 216, 218 of the planar body 212 of the spine 202, and the auxiliary pieces 206 extending perpendicularly from the middle portion 228 of each prong 204.

It should be appreciated that the relative positions of the prongs 104 and auxiliary pieces 106, or the prongs 204 and the auxiliary pieces 206 can be varied, such as positioned at different locations, such that the auxiliary pieces 106 or auxiliary pieces 206 extend perpendicularly from a different portion of the prongs 104 or prongs 204. It should also be appreciated that the different relative positions of the prongs 104 and auxiliary pieces 106, or the prongs 204 and the auxiliary pieces 206, and/or the configuration of each of the components, changes the magnetic flux field generated by the induction welding coil 100 or the induction welding coil 200. That is, the magnetic field lines can be differently guided by changing the arrangement or configuration of the components of the induction welding coil 100 or the induction welding coil 200.

Variations and modifications are contemplated. For example, as shown in FIG. 3, an induction welding coil 250 includes a ferrite core formed from a spine 252 (e.g., a ferrite slab having a planar body 262) and a pair of prongs 254 extending therefrom. Additionally, or optionally, auxiliary pieces 256 protrude from each of the prongs 254. However, in this example, only one auxiliary piece 256 protrudes from each of the prongs 254. In the illustrated example, the prongs 254 extend from ends 264, 266 of the spine 252 in a direction perpendicular to the spine 252 similar to FIG. 1. That is, the spine 252 and pair of prongs 254 form a generally "U-shaped" core as viewed in FIG. 3. It should be noted that while the prongs 254 are illustrated as abutting ends 264, 266 of the planar body 262 of the spine 252, to thereby extend from sides of the planar body 262, in some examples, the prongs 254 extend from a top surface or a bottom surface of the planar body 262.

The auxiliary pieces 256 extend perpendicular to the prongs 254 and parallel to the spine 252. In the illustrated example, the spine 252 and auxiliary pieces 256 are generally rectangular ferrite pieces or slabs, wherein the auxiliary pieces 256 are not rotated generally ninety degrees relative to the spine 252 as in the induction welding coils 100 and 200. That is, the orientation of the spine 252 and auxiliary pieces 256 is the same relative to the prongs 254. It should be appreciated that different orientations, as well as sizes and shapes of the spine 252, the prongs 254, and auxiliary pieces 256 are contemplated by the present disclosure. The configuration of the spine 252, the prongs 254, and auxiliary pieces 256 are shown for illustration only. That is, the size (including thickness), shape, orientation, etc. of the spine 252, the prongs 254, and the auxiliary pieces 256 can be varied to control or "shape" the magnetic flux generated by the induction welding coil 250. In some examples, one surface of the auxiliary pieces 256 are in a same plane as the susceptor wires 110.

In some examples, the auxiliary pieces 256 are positioned outside of a welding patch (e.g., outside a patch of susceptor wires 110), such as when the auxiliary pieces 256 and patch occupy the same plane. In other examples, the auxiliary pieces 256 are not parallel to the spine 252, but tilting toward or away from the patch as the auxiliary pieces 256 extend from the prong 254 toward the center of the induction welding coil 250. The auxiliary pieces 256 can be cut in some examples so that one surface touches the prong 254 or not cut so that a triangular prism gap forms between the auxiliary piece 256 and the prong 254.

The induction welding coil 250 further includes coil 258 of wire 130 extending around and surrounding the spine 252. That is, a plurality of windings 272 of coil 258 of wire 130 extend around the spine 252 along a longitudinal axis thereof. The size and placement of the windings 272 can be varied and configured according to coil wire placement techniques in the induction welding coil art. For example, the configuration of the coil 258 of wire 130 can be provided based on the requirements for the induction welding, the type of induction welding system to be used, etc. It should be noted that in some examples, lead wires to coil 258 of wire 130 are connected to a power supply (not shown) that provides voltage at a specified frequency, such as between 10 kHz and 1 MHz. However, other frequencies can be used.

With the present disclosure, the magnetic density lines generated by the induction welding coil 250 are focused and produce more uniform and effective heating of the joint line. That is, the configuration of the induction welding coil 250, including the customizable configuration of the spine 252, the prongs 254, and auxiliary pieces 256, facilitates "guiding" the magnetic flux produced by the coil wire 258. As such, by configuring the various components, including the spine 252, the prongs 254, and auxiliary pieces 256, the magnetic flux is "shaped" in a desired manner. So, for example, the susceptor wires 110, when present, are more evenly heated, resulting in more efficient melting along the joint line.

In one example, a rectangular bobbin configuration is provided having eleven turns of the coil wire 258 (e.g., eleven turns of 14-16 AWG wire composed of Litz wire with a filament diameter small enough to ensure nearly uniform current density in the cross-section of each filament for the applied frequency used). In this example, the coil wire 258 is wound on an additively manufactured ABS plastic bobbin that has a cavity into which the spine 252 (e.g., ferrite spine) is inserted and a cut out on each end for the prongs 254 to be inserted. It should be appreciated that different sizes and spacings of the windings 272 are contemplated. In one example, the windings 272 of the coil wire 258 are arranged to extend across an area adjacent to the susceptor wires 110.

As can be seen, the spine 252, the prongs 254, and auxiliary pieces 256 of the induction welding coil 200 are sized and shaped generally the same as the spine 102, the prongs 104, and auxiliary pieces 106 of the induction welding coil 100. It should be appreciated that the relative positions of the prongs 104 and the auxiliary pieces 106, or the prongs 204 and the auxiliary pieces 206, or the prongs 254 and the auxiliary pieces 256 can be varied, such as positioned at different locations, such that the auxiliary pieces 106, the auxiliary pieces 206, or the auxiliary pieces 256 extend perpendicularly from a different portion of the prongs 104, the prongs 204, or the prongs 254, respectively. It should also be appreciated that the different relative positions of the prongs 104 and the auxiliary pieces 106, the prongs 204 and the auxiliary pieces 206, the prongs 254 and the auxiliary pieces 256, and/or the configuration of each of the components, changes the magnetic flux field generated by the induction welding coil 100, the induction welding coil 200, or the induction welding coil 250. That is, the magnetic field lines can be differently guided by changing the arrangement or configuration of the components of the induction welding coil 100, the induction welding coil 200, or the induction welding coil 250.

Thus, in some examples, the spines 102, 202, and 252 generally define a planar base (illustrated is some examples as the planar body 114, 212, and 262) with the prongs 104, 204, and 254 generally defining arms that extend therefrom. Within this structure, that is, between the arms, the auxiliary pieces 106, 206, and 256 define inward extension that extend generally parallel to the spines 102, 202, and 252 and inward from the prongs 104, 204, and 254. As such, each of the induction welding coil 100, the induction welding coil 200, and the induction welding coil 250 has a generally U-shaped configuration.

Figure 4:
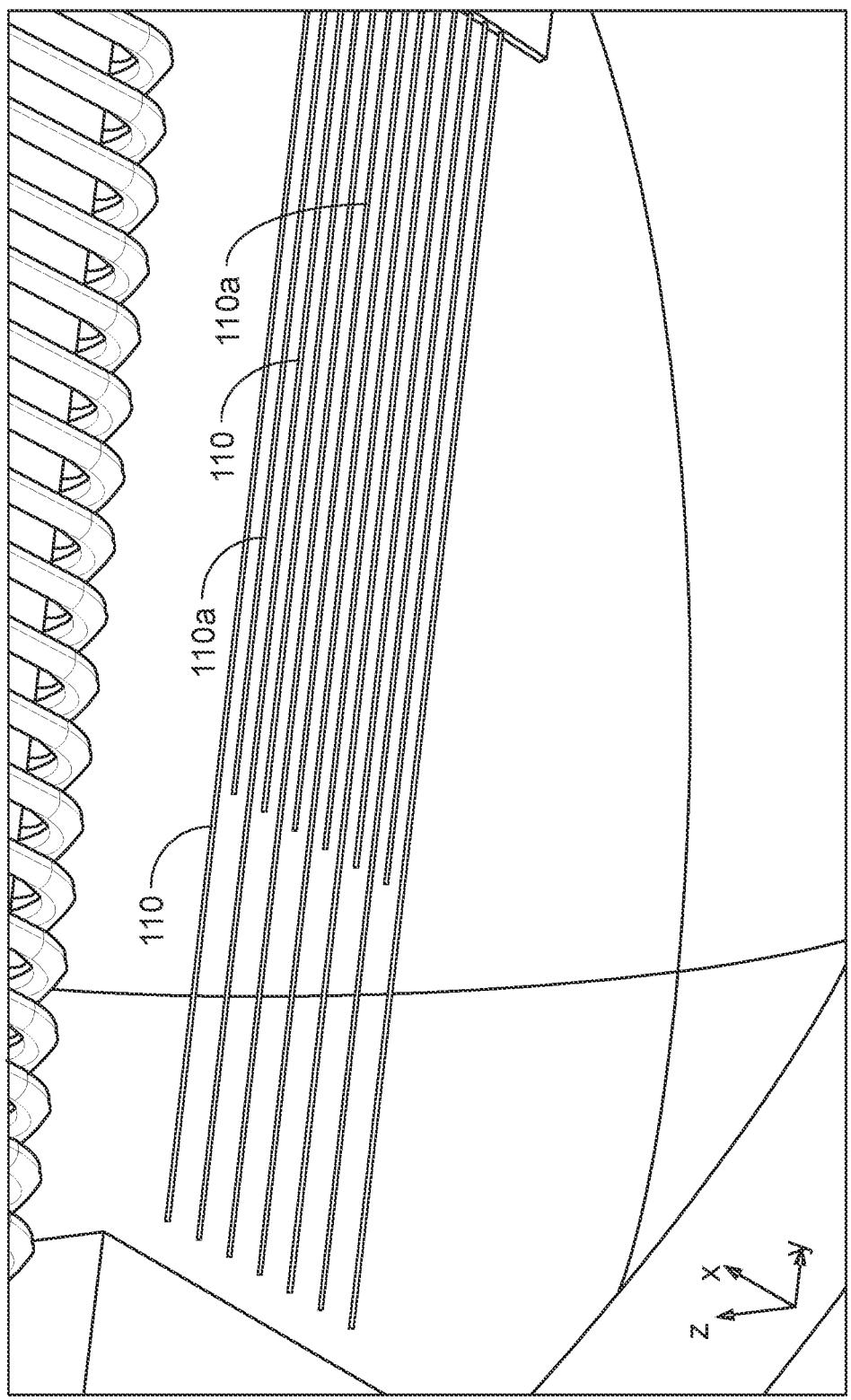
FIG. 4 is an illustration of susceptor wires according to an implementation of the present disclosure.

In some examples, the susceptor wires 110 are arranged or configured to improve the heating along the joint line or other welding interface. For example, as illustrated in FIG. 4, the susceptor wires 110 are arranged in a staggered or offset configuration to vary the density of the susceptor wires 110 along the joint line. That is, the configuration of the susceptor wires 110 include nested susceptor wires 110a that vary the spacing between the susceptor wires 110 along a length of the joint line or welding interface. In one example, the susceptor wires 110, including the nested susceptor wires 110a, are arranged such that the wire density in increased along a middle portion of the weld line (e.g., in a middle portion of a weld patch), which results in more uniform heating across the entire weld line. That is, without the configuration of the susceptor wires 110, including the nested susceptor wires 110a, a longer heating time is needed for the center of the weld patch (i.e., with constant spacing between the susceptor wires 110 that defines a constant density, the welding patch is cooler in the center region). As such, a desirable heating effect is achieved with the susceptor wires 110, including the nested susceptor wires 110a, that define a varied density of wires. Thus, with the susceptor wires 110, including the nested susceptor wires 110a, that together define a varied density of wires along the weld line, more even heating can be achieved. And, with the use of the spine 102, the prongs 104, and auxiliary pieces 106, the induction welding coil 100 provide more even and efficient heating along the weld line.

Figure 5:
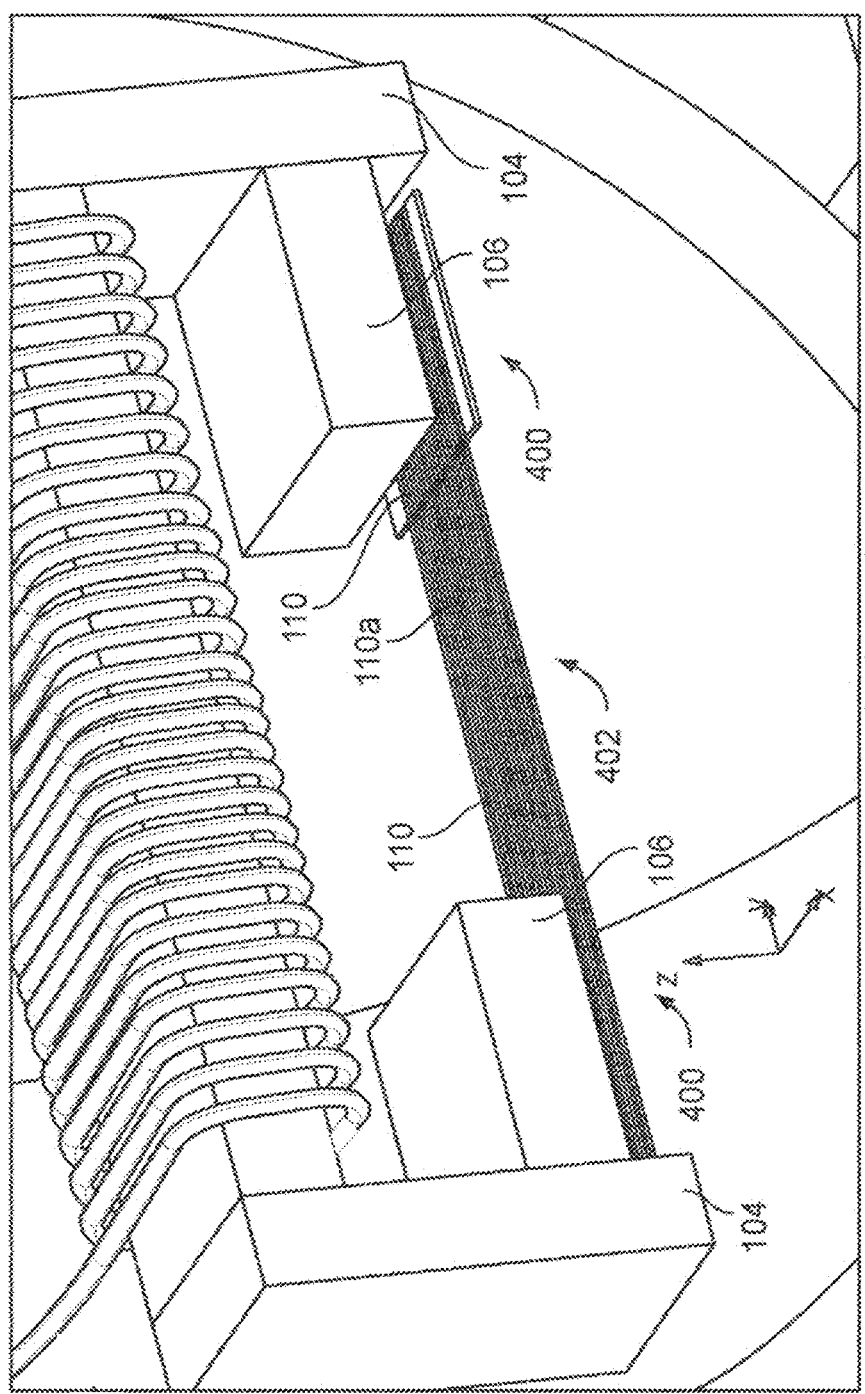
FIG. 5 is another illustration of susceptor wires according to an implementation of the present disclosure.

In one example, the density of the susceptor wires 110 is increased between the pair of auxiliary pieces 106. That is, the susceptor wires 110 adjacent to (e.g., below) the auxiliary pieces 106 do not have the nested arrangement (i.e., do not include the nested susceptor wires 110a), while the nested susceptor wires 110a are provided between the auxiliary pieces 106. For example, and with reference to FIG. 5, the density of the susceptor wires 110 is greater in an area 402 than in the areas 400. As can be seen, in the area 402, the nested susceptor wires 110a are also provided (i.e., the nested susceptor wires 110a are not provided in the areas 400).

It should be noted that the heating of the susceptor wires 110 is proportional to the square of the induced current in the wire. As such, by studying different ferrite core arrangements (e.g., as illustrated by the induction welding coil 100, the induction welding coil 200, or the induction welding coil 250) and the effect the arrangement has on the induced current density along the wire, an optimized geometry for a welding "wand" can be discovered. That is, an optimized configuration of the components is determined. In one example, the induction welding coil 100, the induction welding coil 200, or the induction welding coil 250 is configured such that even current density is generated along the wire (e.g., by plotting current density along the susceptor wires 110).

It should be noted that any type of susceptors (e.g., smart susceptors) can be used and positioned between the composite parts. While some examples describe the plurality of susceptors being configured as susceptor wires and positioned between surfaces of the plurality of part, other susceptor components can be used. The susceptors are formed of a material configured to generate heat when exposed to a magnetic flux in various examples. The material of the plurality of susceptors can be, for example, a metal, a metal alloy, a ceramic, a metalized film, or any other suitable material. In some examples, the plurality of susceptors comprise a metallic alloy having ferromagnetic properties. In some examples, a ferromagnetic material for the plurality of susceptors is selected based on a desired welding temperature. For example, the material for the plurality of susceptors is selected based on a temperature at which a ferromagnetic material becomes non-magnetic. This temperature is also known as a Curie temperature. A ferromagnetic material in some examples is selected for the plurality of susceptors such that the Curie temperature for the ferromagnetic material corresponds to a desired welding temperature.

The plurality of susceptors in some examples are configured as wires (e.g., the susceptor wires 110). At low temperature, the magnetic permeability is high and thus the skin depth is small, resulting in high resistance to current flow. The magnetic field induces strong eddy currents which then generate lots of heat due to the high resistance to current flow. The wires forming the plurality of susceptors have a diameter of 0.01 inches in one example. However, the diameter, and other characteristics of the plurality of susceptors can be varied as desired or needed, such as based on magnetic permeability requirements.

In operation, the plurality of susceptors generate heat when exposed to a magnetic flux generated by the induction welding coil 100, 200, or 250. The plurality of susceptors are used to apply heat to a number of joining points (e.g., weld interface) of, for example, composite parts during a welding process as described herein. That is, the plurality of susceptors are placed between components to promote welding thereof, particularly induction welding, with the induction welding coil 100, 200, or 250 provide a more uniform heating thereof. The plurality of susceptors can be placed in different orientations. In one example, the plurality of susceptors are placed substantially parallel to a direction of the magnetic flux. When a magnetic field is applied, induced currents are generated circumferentially around susceptor wires. It should be noted that thermal leveling of the heated plurality of susceptors can be reached at a desired welding temperature due to the decay of the magnetic properties of the wires of the plurality of susceptors.

It should be noted that the various components described herein can be formed from different materials. Additionally, the various components can be formed using different processes and coupled together using different techniques.

Figure 6:
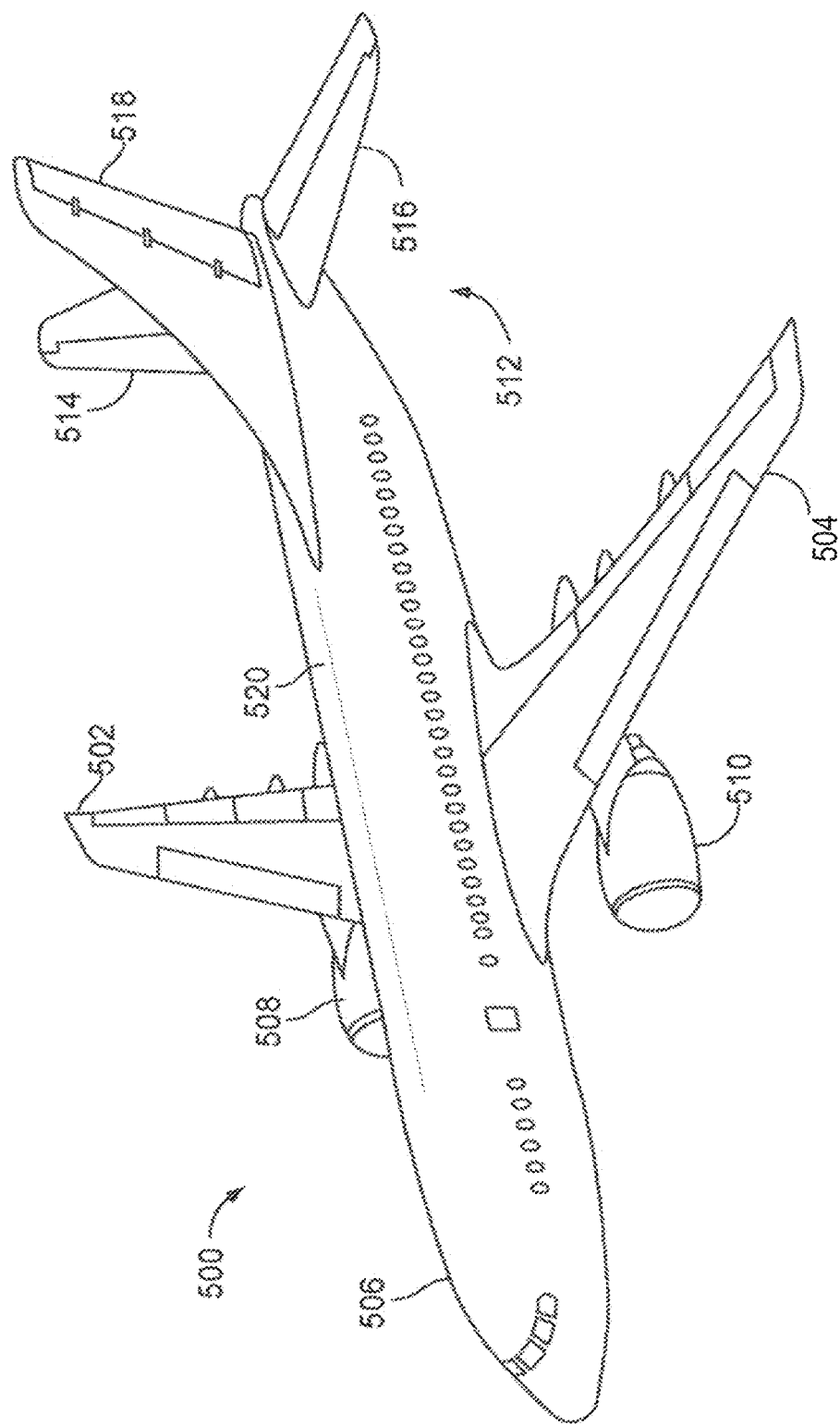
FIG. 6 is a schematic perspective view of an aircraft in which induction welding can be performed according to an implementation.

One or more examples allow for fabrication of composite parts, such as thermoplastic aircraft parts for an aircraft 500 as illustrated in FIG. 6. The aircraft 500 has a wing 502 and a wing 504 attached to a body 506. The aircraft 500 also includes an engine 508 attached to the wing 502 and an engine 510 attached to the wing 504. The body 506 has a tail section 512 with a horizontal stabilizer 514, a horizontal stabilizer 516, and a vertical stabilizer 518 attached to the tail section 512 of the body 506. The body 506 in some examples has a composite skin 520.

The aircraft 500 is an example of an aircraft in which welded thermoplastic structures can be implemented in accordance with various examples described herein. In one particular example as described in more detail herein, a composite bracket and blade stringer of the aircraft 500 is a welded thermoplastic structure formed according to the present disclosure. In other examples, a structural support such as a spar, rib, or other structural support of the wing 502, the wing 504, or the body 506 welded to another component comprises a thermoplastic structure. For example, a structural support of the body 506 welded to the composite skin 520 can comprise a welded thermoplastic structure.

In some examples, the present disclosure allows induction welding of different geometries or configurations of parts with magnetic flux from the induction welding coil 100, 200, or 250 applied to only one side of the components to be welded (instead of both sides as is performed by other welding systems). For example, the induction welding coils 100, 200, or 250 allows for induction welding in areas with limited space or geometry wherein induction welding can only be performed at one side of the components (e.g., a composite bracket and stringer within the aircraft 500).

The illustration of the aircraft 500 is not meant to imply physical or architectural limitations to the manner in which an illustrative configurations can be implemented. For example, although the aircraft 500 is a commercial aircraft, the aircraft 500 can be a military aircraft, a rotorcraft, a helicopter, an unmanned aerial vehicle, or any other suitable aircraft.

Additionally, although the illustrative examples are described with respect to an aircraft, the present disclosure can be applied to other types of platforms. The platform can be, for example, a mobile platform, a stationary platform, a land-based structure, an aquatic-based structure, and a space-based structure. More specifically, the platform can be a surface ship, a tank, a personnel carrier, a train, a spacecraft, a space station, a satellite, a submarine, an automobile, a power plant, a bridge, a dam, a house, a windmill, a manufacturing facility, a building, and other suitable platforms.

Figure 7:
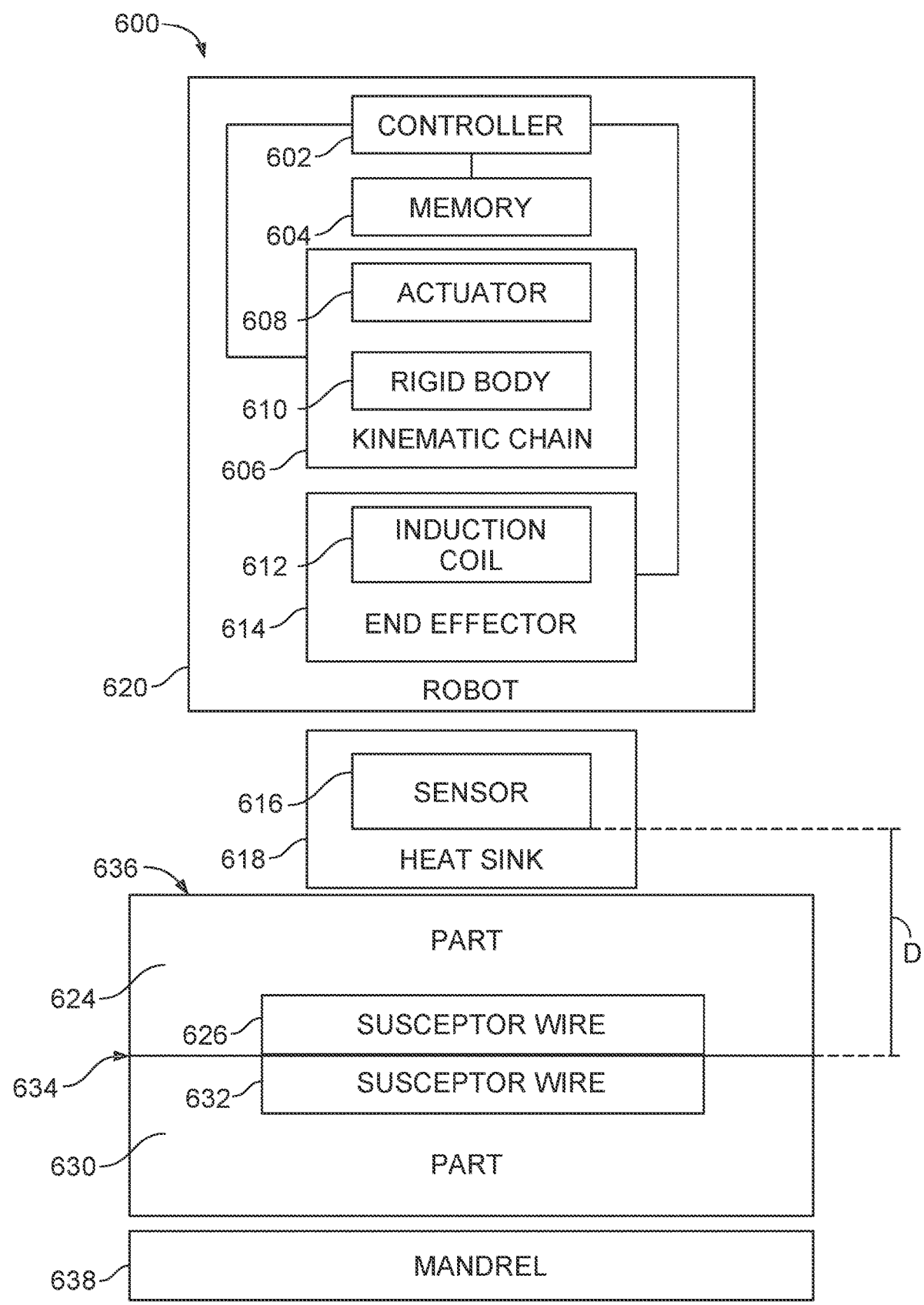
FIG. 7 is block diagram illustrating an induction welding system according to an implementation of the present disclosure.

FIG. 7 is a block diagram of an induction welding system 600 in an illustrative example in which the induction welding coil 100, 200, or 250 can be operated. The induction welding system 600 comprises any system, device, or component operable to generate magnetic fields which inductively heat an interface 634 between thermoplastic composite parts 624 and 630 in order to form an induction weld. In this example, the induction welding system 600 comprises robot 620, which includes a controller 602 and a memory 604 for managing the operations of a kinematic chain 606 comprising one or more of actuator 608 and one or more rigid bodies 610. By controlling the motions of kinematic chain 606, the position, speed, and/or direction of an end effector 614 bearing an induction welding coil 612 (which may be embodied or implemented as the induction welding coil 100, 200, or 250) may be adjusted. The controller 602 further controls an amount of current applied to the induction welding coil 612, in order to increase or decrease a magnetic field generated by the induction welding coil 612. This in turn controls a temperature of a weld interface 634 between the thermoplastic composite parts 624 and 630, where induction welding is desired. The controller 602 can be implemented, for example, as custom circuitry, as a hardware processor executing programmed instructions, or some combination thereof. The controller 602 can further direct the operations of the various components of a robot 620 in accordance with instructions stored in a Numerical Control (NC) program stored in the memory 604.

The induction welding coil 612 generates a magnetic field at one side of the thermoplastic composite parts 624 and 630 in response to applied current. The intensity of the magnetic field that is generated is based on the amount of current applied. Thus, the induction welding coil 612 is controllably adjusted in order to generate magnetic fields of desired strength.

Due to the design of induction welding coil 612, the magnetic fields generated by induction welding coil 612 are "guided" proximate to the weld interface 634 between the thermoplastic composite parts 624 and 630. In response to experiencing the magnetic field, susceptor wires 626 and 632 (e.g., carbon fibers) generate heat. In one example, the susceptor wires 626 and 632 are embodied using the susceptor wires 110 installed on any induction welding coils 100, 200, 500. This increases in temperature causes the thermoplastic of the thermoplastic composite parts 624 and 630 to reach a transition temperature. At the transition temperature, the thermoplastics of the thermoplastic composite parts 624 and 630 meld or weld together. This merges the thermoplastic composite parts 624 and 630 at the weld interface 634 into an integral mass that cools into a single matrix of thermoplastic. The thermoplastic forming the thermoplastic composite parts 624 and 630 can comprise any suitable thermoplastic, such as Polyetheretherketone (PEEK), Polyetherketoneketone (PEKK), etc. A mandrel 638 optionally supports laminates during performance of the induction weld in some examples.

A heat sink 618 is separated from the weld interface 634 at which induction welding takes place. The heat sink 618 absorbs and disperses heat from the surface 636 of the thermoplastic composite part 624. This ensures that heat generated within the thermoplastic composite part 624 at the weld interface 634 does not cause the surface 636 to exceed the transition temperature (which would result in undesired structural changes to the thermoplastic composite parts 624 and 630).

In one example, a sensor 616 is optionally embedded within heat sink 618, and measures temperatures (or voltages indicative of magnetic field strength) at a distance D away from the weld interface 634. However, in other examples, the sensor 616 is optionally placed at a left or right edge of the heat sink 618, or at the left or right edge of the weld interface 634, or beneath the thermoplastic composite part 624. Based on a known relationship between temperature at the weld interface 634 and temperature at heat sink 618 (or based on a known relationship between measured magnetic field strength and current applied to induction welding coil 612), a temperature of the induction weld performed at the weld interface 634 can be determined. The sensor 616 can comprise a thermocouple or an Electromagnetic Field (EMF) sensor (e.g., an EMG sensor having a calibrated loop having at least two hundred loops), such as a sensor designed for operation to acquire measurements at a sampling rate between one and five Megahertz. In other examples, the sensor 616 comprises an infrared (IR) sensor that measures temperature.

Thus, various examples provide induction welding having a more uniform heating across the weld joint, line, or patch between two parts to be induction welded when applying magnetic flux from one side of the two parts. In some examples, the present disclosure allows for induction welding in locations or geometries not previously capable of having induction welding performed (e.g., in tight spaces or geometries wherein only one side of the part to be welded are accessible). That is, with the induction welding coil 100, 200, or 250 configured and operated herein, induction welding can be performed from one side of the parts to be welded instead having to apply the magnetic flux to both sides of the parts. In some examples, the induction welding coil 100, 200, or 250 forms part of a tool or "wand" that is controlled by the induction welding system 600 to perform induction welding of thermoplastics using susceptors. In some examples, the susceptors are configured as wires positioned between or within elements used to weld the thermoplastic part and that generate heat when exposed to a magnetic field generated by the tool.

In operation, one-sided induction welding is performed using the induction welding coil 100, 200, or 250 to create an induction weld. For example, the robot 620 translates the induction welding coil 612 (embodied or configured as the induction welding coil 100, 200, or 250) along a weld direction to generate a magnetic field having a greatest field strength along the weld interface 634 between the thermoplastic composite parts 624 and 630. The heat that results along the weld interface 634 is more evenly distributed, such that cooler or hotter spots are reduced or eliminated.

Various examples allow for assembly of composite parts using controlled directional magnetic flux induced co-cure or thermal welding in a single manufacturing process, wherein the magnetic field is generated on one side of the components to be welded together, while provide a uniform heating of the weld interface between the components. That is, the induction welding coil 100, 200, or 250 controls or guides the directional magnetic flux to cause heating of the susceptors in some examples that co-bond adjacent parts. Different composite parts can be assembled or form in accordance with the present disclosure.

Figure 8:
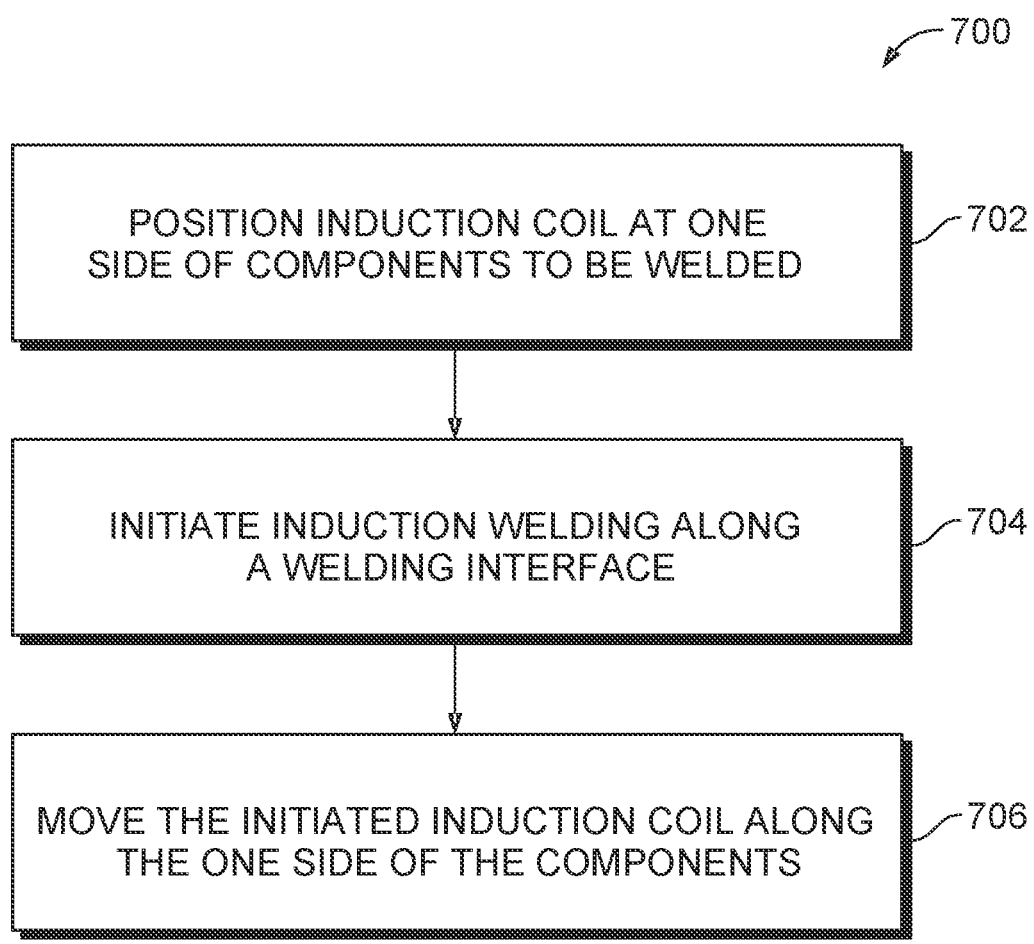
FIG. 8 is a flowchart illustrating a method for induction welding according to an implementation of the present disclosure.

FIG. 8 is an illustration of a flowchart of a method 700 for induction welding in accordance with one or more examples. The method 700 can be implemented, for example, to assemble part of an aircraft that would otherwise be mechanically fastened together, by directing magnetic flux to facilitate co-bonding of various parts. It should be noted that the steps in the method 700 can be performed in a different order than shown, one or more steps can be added or removed, and the steps can be performed concurrently, simultaneously, or sequentially. It should also be noted that the steps of the method 700 are described with reference to the induction welding system 600 of FIG. 7, but the method 700 can be performed in other systems.

The method 700 includes at 702 positioning an induction welding coil at one side of components to be welded. For example, the induction welding coil 100, 200, or 250 is positioned at one side or end of two component parts that are to be induction welded. The induction welding coil 100, 200, or 250 is positioned and spaced from or in contact with the side of the components to allow induction welding to be performed. That is, the induction welding coil 100, 200, or 250 is positioned based on induction welding techniques in the induction welding technology area.

The method 700 further includes at 704 initiating induction welding along a weld interface. For example, the controller 602 initiates induction welding along a weld interface of a first composite part (e.g., along the weld interface 634 at the thermoplastic composite parts 624 and 630) by operating the induction welding coil 612 (embodied as the induction welding coils 100, 200, or 250). This is performed in order to join the thermoplastic composite parts 624 and 630. Initiating induction welding can comprise applying a current to the induction welding coil 612 in order to generate a magnetic field (e.g., coils are energized, which results in an electrical current to flow within and heat the susceptors) that is guided towards the weld interface to uniformly heat the weld interface, and then moving the induction welding coil 612 along a weld line at 706 in order to fuse thermoplastic from two different laminates along a substantial distance (e.g., having a length several to many feet). The width of the weld line may be substantially smaller than the length, and may for example be an inch or less.

Figure 9:
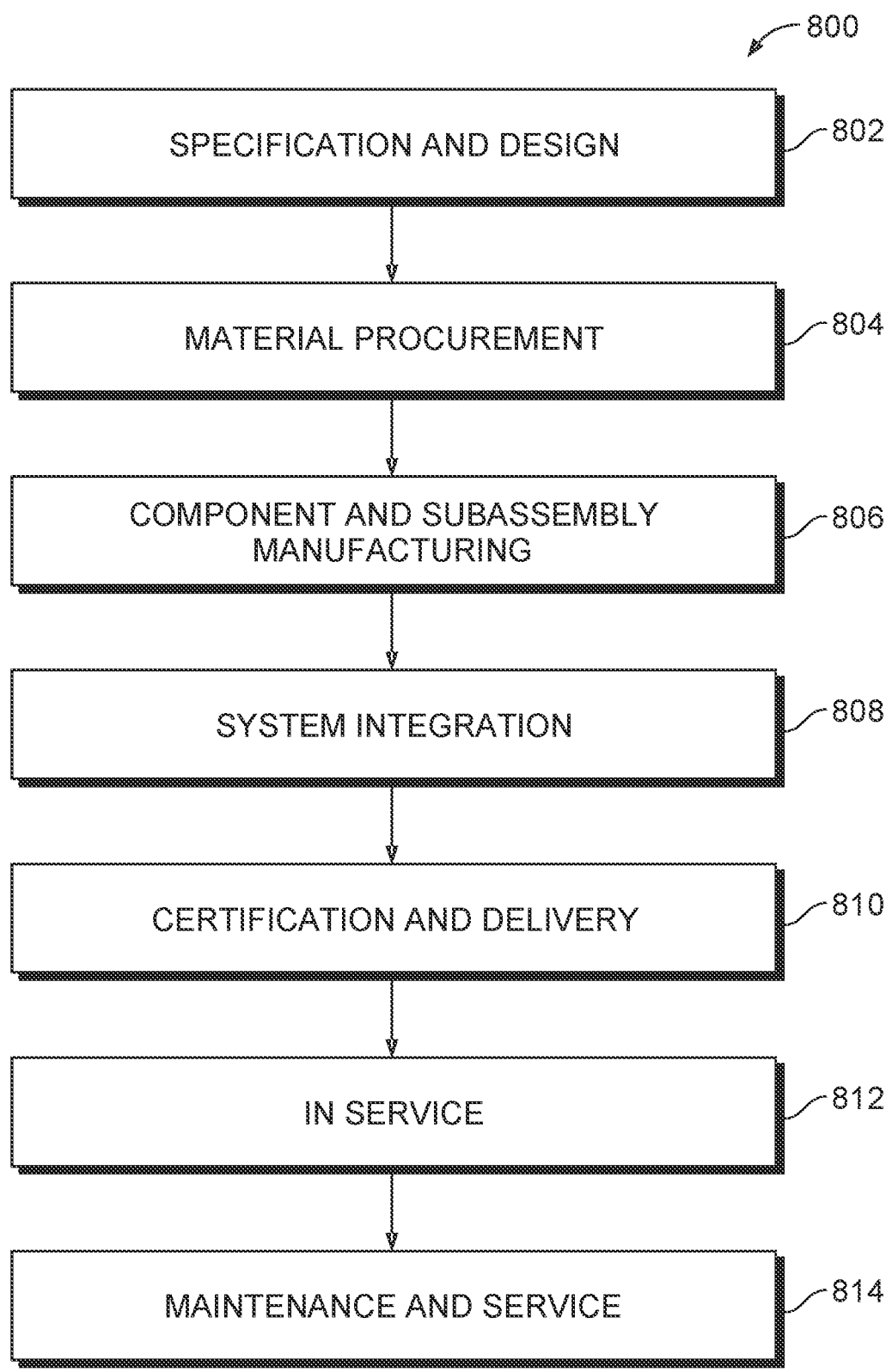
FIG. 9 is a block diagram of an aircraft production and service methodology.

Examples of the disclosure can be described in the context of an aircraft manufacturing and service method 800 as shown in FIG. 9. During pre-production, illustrative method 800 can include specification and design 802 of an aircraft (e.g., the aircraft 500 shown in FIG. 6) and material procurement 804. During production, component and subassembly manufacturing 806 and system integration 808 of the aircraft take place. Thereafter, the aircraft can go through certification and delivery 810 to be placed in service 812. While in service by a customer, the aircraft is scheduled for routine maintenance and service 814 (which can also include modification, reconfiguration, refurbishment, and so on).

Each of the processes of the illustrative method 800 can be performed or carried out by a system integrator, a third party, and/or an operator (e.g., a customer). For the purposes of this description, a system integrator can include, without limitation, any number of aircraft manufacturers and major-system subcontractors; a third party can include, without limitation, any number of vendors, subcontractors, and suppliers; and an operator can be an airline, leasing company, military entity, service organization, and so on.

It should be noted that any number of other systems can be included with the system described herein. Also, although an aerospace example is shown, the principles can be applied to other industries, such as the automotive industry.

Apparatus and methods shown or described herein can be employed during any one or more of the stages of the manufacturing and service method 800. For example, components or subassemblies corresponding to component and subassembly manufacturing 806 can be fabricated or manufactured in a manner similar to components or subassemblies produced while the aircraft is in service. Also, one or more aspects of the apparatus, method, or combination thereof can be utilized during the production states of subassembly manufacturing 806 and system integration 808, for example, by substantially expediting assembly of or reducing the cost of the aircraft. Similarly, one or more aspects of the apparatus or method realizations, or a combination thereof, can be utilized, for example and without limitation, while the aircraft is in service, e.g., maintenance and service 814.

Thus, various examples facilitate induction welding of parts by controlling the magnetic flux to improve the heating of (e.g., more uniformly heat) the weld interface between the parts from a single side of the parts. The present disclosure, including the examples described herein, can be implemented using different manufacturing environments.

The illustration of the manufacturing environment described herein is not meant to imply physical or architectural limitations to the manner in which an illustrative example is implemented. Other components in addition to or in place of the ones illustrated can be used. Some components can be removed. Also, the blocks are presented to illustrate some functional components. One or more of these blocks can be combined, divided, or combined and divided into different blocks when implemented in an illustrative example.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

Any range or value given herein can be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above can relate to one embodiment or can relate to several embodiments. The embodiments are not limited to those that solve any or all of the stated problems or those that have any or all of the stated benefits and advantages. It will further be understood that reference to 'an' item refers to one or more of those items.

The embodiments illustrated and described herein as well as embodiments not specifically described herein but within the scope of aspects of the claims constitute exemplary means for forming or assembling thermoplastic sandwich panels.

The order of execution or performance of the operations in examples of the disclosure illustrated and described herein is not essential, unless otherwise specified. That is, the operations can be performed in any order, unless otherwise specified, and examples of the disclosure can include additional or fewer operations than those disclosed herein. For example, it is contemplated that executing or performing a particular operation before, contemporaneously with, or after another operation (e.g., different steps) is within the scope of aspects of the disclosure.

The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

Additionally, program code instructions may be stored in memory, and executed by processing circuitry that is thereby programmed, to implement functions of the systems, subsystems, tools, and their respective elements described herein. As will be appreciated, any suitable program code instructions may be loaded onto a computer or other programmable apparatus from a computer-readable storage medium to produce a particular machine, such that the particular machine becomes a means for implementing the functions specified herein. These program code instructions may also be stored in a computer-readable storage medium that can direct a computer, a processing circuitry or other programmable apparatus to function in a particular manner to thereby generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processing circuitry or other programmable apparatus to configure the computer, processing circuitry or other programmable apparatus to execute operations to be performed on or by the computer, processing circuitry or other programmable apparatus.

Retrieval, loading and execution of the program code instructions may be performed sequentially such that one instruction is retrieved, loaded, and executed at a time. In some example implementations, retrieval, loading and/or execution may be performed in parallel such that multiple instructions are retrieved, loaded, and/or executed together. Execution of the program code instructions may produce a computer-implemented process such that the instructions executed by the computer, processing circuitry or other programmable apparatus provide operations for implementing functions described herein. Execution of instructions by a processing circuitry, or storage of instructions in a computer-readable storage medium, supports combinations of operations for performing the specified functions. It will also be understood that one or more functions, and combinations of functions, may be implemented by special purpose hardware-based computer systems and/or processing circuitry which perform the specified functions, or combinations of special purpose hardware and program code instructions.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein. In examples involving a general-purpose computer, aspects of the disclosure transform the general-purpose computer into a special-purpose computing device when configured to execute the instructions described herein.

By way of example and not limitation, computer readable media comprise computer storage media and communication media. Computer storage media include volatile and nonvolatile, removable and non-removable memory implemented in any method or technology for storage of information such as computer readable instructions, data structures, program modules, or the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, solid-state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. In contrast, communication media typically embody computer readable instructions, data structures, program modules, or the like in a modulated data signal such as a carrier wave or other transport mechanism and include any information delivery media.

The following clauses describe further aspects of the present disclosure. In some implementations, the clauses described below can be further combined in any subcombination without departing from the scope of the present disclosure.

Clause Set A:

A1. An induction welding coil comprising:
a spine having a planar body with opposing ends;
a pair of prongs extending perpendicularly from the opposing ends of the spine, each of the prongs having a planar body, wherein the spine and the pair of prongs are formed from a ferrite material to define a ferrite core; and
a coil wire having a plurality of winding that surround the planar body of the spine.

A2. The induction welding coil of clause A1, further comprising at least one auxiliary piece extending from each prong of the pair of prongs, the auxiliary pieces being planar and formed from a ferrite material.

A3. The induction welding coil of clause A2, wherein each prong of the pair of prongs has opposing ends, one of the opposing ends of each prong abutting a corresponding opposing end of the planar body of the spine, and the at least one auxiliary piece extending perpendicularly from the other opposing end of each prong.

A4. The induction welding coil of clause A2, wherein each prong of the pair of prongs has opposing ends, one of the opposing ends of each prong abutting a corresponding opposing end of the planar body of the spine, and the at least one auxiliary piece extending perpendicularly from a middle portion of each prong.

A5. The induction welding coil of clause A2, further comprising at least two auxiliary pieces extending from each prong of the pair of prongs, the at least two auxiliary pieces spaced apart on each prong.

A6. The induction welding coil of clause A5, wherein the planar body of the at least two auxiliary pieces extending from each prong of the pair of prongs is rotated relative to the body of the spine.

A7. The induction welding coil of clause A1, wherein one prong of the pair of prongs each extend from sides of the opposing ends of the planar body of the spine.

A8. The inducting welding coil of clause A1, further comprising a plurality of susceptor wires extending between the pair of prongs, the plurality of susceptor wires having a varied density along a length thereof.

Clause Set B:

B1. A method for induction welding, the method comprising:
positioning an induction welding coil at one side of components to be welded, the induction welding coil comprising a ferrite core having a spline with a planar body, and a pair of prongs extending perpendicularly from ends of the planar body;
initiating induction welding of the components along a welding interface by applying a current to the induction welding coil to generate a magnetic flux; and
moving the induction welding coil along the one side of the components to thereby inductively weld the components at the welding interface.

B2. The method of clause B1, wherein moving the induction welding coil comprises moving the induction welding coil along only the one side of the components.

B3. The method of clause B2, further comprising positioning a plurality of susceptor wires along the welding interface.

B4. The method of clause B3, wherein positioning the plurality of susceptor wires along the welding interface comprises positioning the plurality of susceptor wires to have a varying density along the welding interface.

B5. The method of clause B3, wherein positioning the plurality of susceptor wires to have a varying density along the welding interface comprises nesting susceptor wires between other susceptor wires.

B6. The method of clause B1, wherein the ferrite core comprises at least one auxiliary piece extending from each prong of the pair of prongs, the auxiliary pieces being planar and formed from a ferrite material.

B7. The method of clause B1, further comprising arranging the ferrite core to have a generally U-shaped configuration.

Clause Set C:

C1. An induction welding system comprising:
a robot;
an induction welding coil communicatively coupled to the robot, the induction welding coil comprising:
a spine having a planar body with opposing ends;
a pair of prongs extending perpendicularly from the opposing ends of the spine, each of the prongs having a planar body, wherein the spine and the pair of prongs are formed from a ferrite material to define a ferrite core; and
a coil wire having a plurality of winding that surround the planar body of the spine,
wherein the robot is configured to control movement of the induction welding coil along only one side of components to be inductively welded to thereby melt a weld interface between the components.

C2. The induction welding system of clause C1, further comprising at least one auxiliary piece extending from each prong of the pair of prongs, the auxiliary pieces being planar and formed from a ferrite material.

C3. The induction welding system of clause C2, wherein each prong of the pair of prongs has opposing ends, one of the opposing ends of each prong abutting a corresponding opposing end of the planar body of the spine, and the at least one auxiliary piece extending perpendicularly from the other opposing end of each prong.

C4. The induction welding system of clause C2, wherein each prong of the pair of prongs has opposing ends, one of the opposing ends of each prong abutting a corresponding opposing end of the planar body of the spine, and the at least one auxiliary piece extending perpendicularly from a middle portion of each prong.

C5. The induction welding system of clause C2, further comprising at least two auxiliary pieces extending from each prong of the pair of prongs, the at least two auxiliary pieces spaced apart on each prong.

C6. The induction welding system of clause C5, wherein the planar body of the at least two auxiliary pieces extending from each prong of the pair of prongs being rotated relative to the body of the spine.

C7. The inducting welding system of clause C1, further comprising a plurality of susceptor wires extending between the pair of prongs, the plurality of susceptor wires having a varied density along a length thereof.

It is to be understood that the above description is intended to be illustrative, and not restrictive. For example, the above-described embodiments (and/or aspects thereof) can be used in combination with each other. In addition, many modifications can be made to adapt a particular situation or material to the teachings of the various embodiments of the disclosure without departing from their scope.

While the dimensions and types of materials described herein are intended to define the parameters of the various embodiments of the disclosure, the embodiments are by no means limiting and are example embodiments. Many other embodiments will be apparent to those of ordinary skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person of ordinary skill in the art to practice the various embodiments of the disclosure, including making and using any devices or systems and performing any incorporated methods. The patentable scope of the various embodiments of the disclosure is defined by the claims, and can include other examples that occur to those persons of ordinary skill in the art. Such other examples are intended to be within the scope of the claims if the examples have structural elements that do not differ from the literal language of the claims, or if the examples include equivalent structural elements with insubstantial differences from the literal language of the claims.

What is claimed is:

1. An induction welding coil that comprises:
   a spine that comprises a planar body that comprises opposing ends;
   a pair of prongs that extend perpendicularly from the opposing ends of the spine, wherein each prong of the prongs comprise, respectively:
     a planar body, wherein the spine and the pair of prongs are formed from a ferrite material to define a ferrite core; and
     opposing ends, wherein one of the opposing ends of each prong abut an opposing end of the planar body of the spine, and at least one auxiliary piece extends perpendicularly from a middle portion of each prong, wherein the auxiliary piece comprises:
       a planar shape; and
       a ferrite material; and
   a coil of wire that comprises a plurality of windings that surround the planar body of the spine.

2. The induction welding coil of claim 1, wherein each prong of the pair of prongs has opposing ends, a first end of the opposing ends of each prong abutting a corresponding opposing end of the planar body of the spine, and the at least one auxiliary piece extending perpendicularly from a second end of the opposing ends of each prong.

3. The induction welding coil of claim 1, further comprising at least two auxiliary pieces extending from each prong of the pair of prongs, the at least two auxiliary pieces spaced apart on each prong.

4. The induction welding coil of claim 3, wherein the at least two auxiliary pieces extending from each prong of the pair of prongs is rotated relative to the spine.

5. The induction welding coil of claim 1, wherein one prong of the pair of prongs each extend adjacently from the opposing ends of the planar body of the spine.

6. The inducting welding coil of claim 1, further comprising a plurality of susceptor wires extending between the pair of prongs, the plurality of susceptor wires having a varied density along a length thereof.

7. A method for induction welding, the method comprising:
   positioning an induction welding coil at one side of components to be welded, the induction welding coil comprising a ferrite core and a pair of prongs extending perpendicularly from ends of a planar body, the ferrite core comprising:
     a spine comprising the planar body; and
     at least one auxiliary piece extending from each prong of the pair of prongs, the auxiliary pieces being planar and formed from a ferrite material;
   initiating induction welding of the components along a welding interface by applying a current to the induction welding coil to generate a magnetic flux; and
   moving the induction welding coil along the one side of the components to thereby inductively weld the components at the welding interface.

8. The method of claim 7, wherein moving the induction welding coil comprises moving the induction welding coil along only the one side of the components.

9. The method of claim 7, further comprising positioning a plurality of susceptor wires along the welding interface.

10. The method of claim 9, wherein positioning the plurality of susceptor wires along the welding interface comprises positioning the plurality of susceptor wires to have a varying density along the welding interface.

11. The method of claim 10, wherein positioning the plurality of susceptor wires to have a varying density along the welding interface comprises nesting susceptor wires between other susceptor wires.

12. The method of claim 7, wherein each prong of the pair of prongs comprises opposing ends, wherein one of the opposing ends of each prong abut an opposing end of the planar body of the spine, and at least one auxiliary piece extending perpendicularly from a middle portion of each prong.

13. The method of claim 7, further comprising arranging the ferrite core to have a generally U-shaped configuration.

14. An induction welding system that comprises:
    a robot;
    an induction welding coil communicatively coupled to the robot, wherein the induction welding coil comprises:
      a spine that comprises a planar body that comprises opposing ends;
      a pair of prongs that extend perpendicularly from the opposing ends of the spine, wherein each prong of the prongs comprises a planar body, wherein the spine and the pair of prongs are formed from a ferrite material to define a ferrite core;
      at least one auxiliary piece that extends from each prong of the pair of prongs, wherein the auxiliary piece comprises:
        a planar shape; and
        a ferrite material; and
      a coil of wire that comprises a plurality of windings that surround the planar body of the spine, wherein the robot is configured to control movement of the induction welding coil along only one side of components to be inductively welded to thereby melt a weld interface between the components.

15. The induction welding system of claim 14, wherein each prong of the pair of prongs comprises opposing ends.

16. The induction welding system of claim 15, further comprising at least two auxiliary pieces extending from each prong of the pair of prongs, the at least two auxiliary pieces spaced apart on each prong.

17. The induction welding system of claim 16, wherein the at least two auxiliary pieces extending from each prong of the pair of prongs being rotated relative to the spine.

18. The induction welding system of claim 14, wherein each prong of the pair of prongs has opposing ends, a first end of the opposing ends of each prong abuts a corresponding opposing end of the planar body of the spine, and the at least one auxiliary piece extends perpendicularly from a second end of the opposing ends of each prong.

19. The induction welding system of claim 14, wherein each prong of the pair of prongs has opposing ends, one of the opposing ends of each prong abutting a corresponding opposing end of the planar body of the spine, and the at least one auxiliary piece extends perpendicularly from a middle portion of each prong.

20. The inducting welding system of claim 14, further comprising a plurality of susceptor wires extending between the pair of prongs, the plurality of susceptor wires having a varied density along a length thereof.

\* \* \* \* \*

UNITED STATES PATENT AND TRADEMARK OFFICE
CERTIFICATE OF CORRECTION

PATENT NO. : 12,251,885 B2
APPLICATION NO. : 17/515383
DATED : March 18, 2025
INVENTOR(S) : Landon Keith Henson and John R. Hull Page 1 of 1

It is certified that error appears in the above-identified patent and that said Letters Patent is hereby corrected as shown below:

In the Claims

Column 20, Line 4, Claim 6 change "The inducting welding" to read -- The induction welding --
Column 21, Line 22, Claim 20 change "The inducting welding" to read -- The induction welding --

Signed and Sealed this
Twenty-ninth Day of April, 2025

Coke Morgan Stewart
*Acting Director of the United States Patent and Trademark Office*